United States Patent [19]

McQueen

[11] Patent Number: 4,594,807
[45] Date of Patent: Jun. 17, 1986

[54] CRAWLING PEST ELIMINATOR SYSTEM AND METHOD

[76] Inventor: Robert McQueen, 2744 Shipley Ter., SE., Washington, D.C. 20020

[21] Appl. No.: 739,531

[22] Filed: May 31, 1985

[51] Int. Cl.$^4$ .................... A01M 7/00; A01M 11/00
[52] U.S. Cl. .................................. 43/132.1; 239/289; 15/339
[58] Field of Search ............... 43/132.1; 239/152, 153, 239/154, 120, 289; 15/257 B, 327 C, 321, 339

[56] References Cited

U.S. PATENT DOCUMENTS

| Re. 26,950 | 9/1970 | Hays | 15/321 |
|---|---|---|---|
| 1,586,484 | 5/1926 | Suggs | 43/139 |
| 1,797,557 | 3/1931 | Stine et al. | 43/139 |
| 2,340,944 | 2/1944 | Easter | 43/139 |
| 2,686,694 | 8/1954 | Freeman | 239/120 |
| 4,141,174 | 2/1979 | Smith | 43/139 |
| 4,160,336 | 7/1979 | Query et al. | 43/132.1 |

FOREIGN PATENT DOCUMENTS 2540719 8/1984 France .................... 15/257 B

OTHER PUBLICATIONS

Michigan Entomological Society Newsletter, vol. 29, No. 1, Mar. 12, 1984, by K. S. Shivashankara Sastry.

Primary Examiner—Nicholas P. Godici
Assistant Examiner—M. Jordan
Attorney, Agent, or Firm—Lalos, Keegan & Kaye

[57] ABSTRACT

A crawling pest eliminator system mounted on a backpack mounting frame. A crawling pest flushing system is supported on the frame for spraying a flushing agent into cracks, crevices and wall voids and thereby initially flushing crawling pests, such as cockroaches, ants and spiders, out of their hiding places. A vacuuming system is also supported on the frame. The vacuuming system includes a vacuum motor, a removable recovery bag and a nozzle adapted to ride on the surfaces for efficiently vacuuming into the recovery bag the eggs of the crawling pests and the crawling pests themselves including those flushed out by the crawling pest flushing system. A flashlight is integrally built into the adapter into which the nozzle is inserted for illuminating the surfaces. A residual depositing system is also supported by the frame for depositing a pesticide residual on these surfaces which have been vacuumed of crawling pests and their eggs by the vacuuming system. A spray gun is selectively communicable with either of the aerosol canisters of the flushing or depositing systems for spraying either the flushing agents or residuals. After the bag has been filled it is removed and destroyed in a blender or crusher.

33 Claims, 9 Drawing Figures

CRAWLING PEST ELIMINATOR SYSTEM AND METHOD

BACKGROUND OF THE INVENTION

The present invention relates to systems and methods for eliminating crawling pests from residential and commercial structures. It more particularly relates to systems and methods for eliminating cockroaches, ants and spiders.

In the past, it is known to eliminate crawling pests by spraying their crawling surfaces with a variety of pesticides. These pesticides, however, do not effectively eliminate the pests. In fact, it has been found that certain varieties of the German cockroach have become resistant to all known pesticides. When a pregnant cockroach is sprayed with the pesticide, even though she may die, she will release her eggs which then will later hatch and the cockroack population will continue to propagate. Also, the eggs themselves are uneffected by any of the commonly-used pesticides. This is particularly troublesome since cockroaches multiply so rapidly. In one study which started with two freshly matured and mated female cockroaches on January 1 with food, good temperature and harborage, it was found that by Christmas day of that same year that there were 22 million adult cockroaches and 162 million nymphs (immature females and males). Thus, it is very important to not leave one resistant female cockroach or her eggs alive.

It has also been found that the use of these toxic pesticides can be very harmful to the occupants of the building. This is especially so where there are young children or infants who are crawling on the floors and putting various objects in their mouths. It may also be in the future that the use of the toxic presently-used pesticides will be severely restricted by the government for environment reasons.

OBJECTS OF THE INVENTION

Accordingly, it is the principal object of the present invention to provide a novel system for eliminating crawling pests.

Another object of the present invention is to provide an improved system for eliminating crawling pests.

A further object of the present invention is to provide a safer system and method for eliminating cockroaches and other crawling insects using minimum amounts of pesticides.

A still further object is to provide an improved method of eliminating crawling pests which have become resistant to current pesticides.

Another object is to provide a novel system and method which effectively eliminate the cockroach egg from the interior of structures.

A further object is to provide a novel system for eliminating crawling pests which minimizes the promotion of the development of insecticide resistance.

A still further object is to provide an apparatus for eliminating crawling pests which is convenient to use and transport.

Other objects and advantages of the present invention will become more apparent to those persons having ordinary skill in the art to which the present invention pertains from the foregoing description taken in conjunction with the accompanying drawings.

DESCRIPTION OF THE PREFERRED EMBODIMENT

Figure 1:
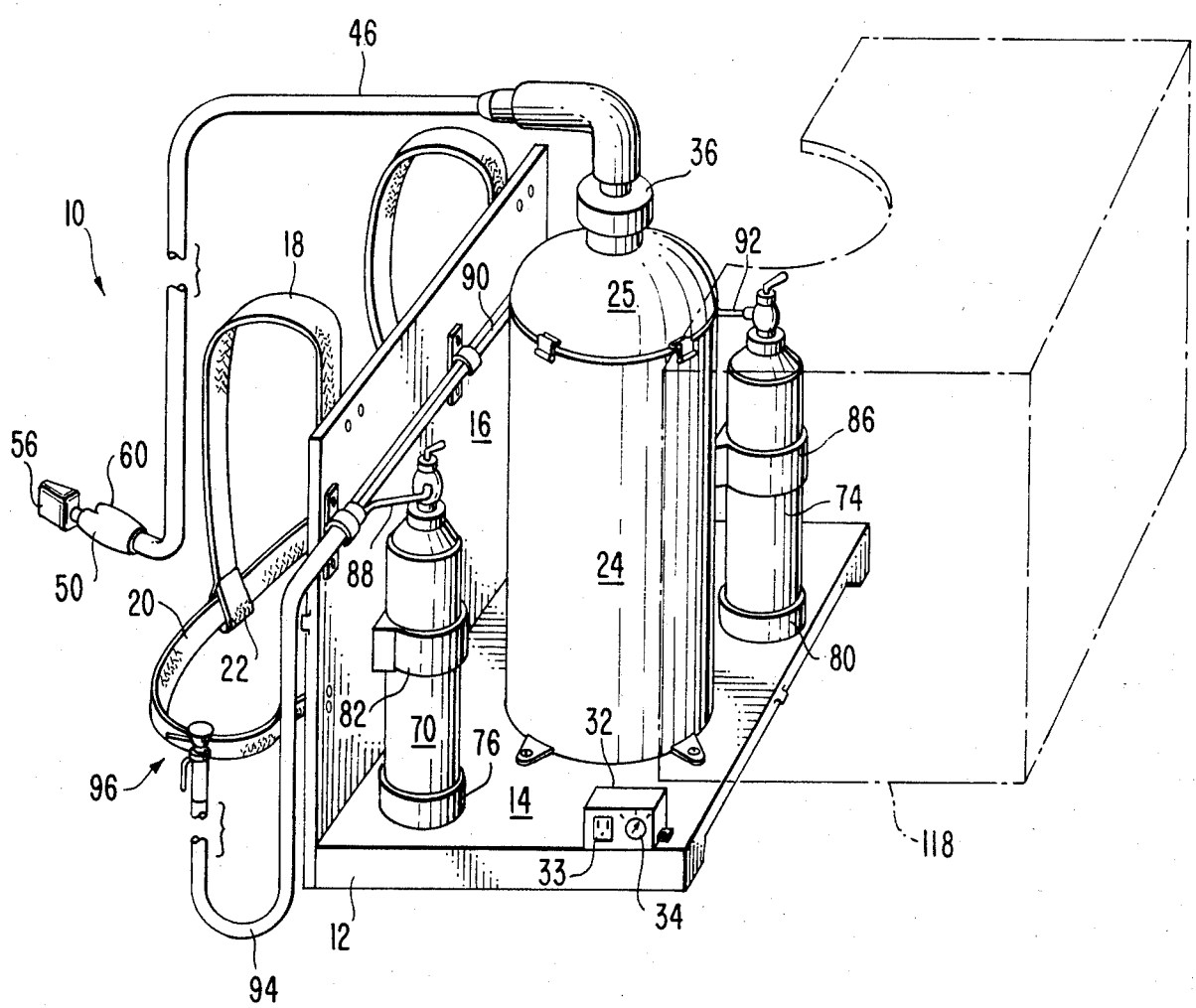
FIG. 1 is a perspective view of a pest eliminator apparatus embodying the present invention with the apparatus cover removed for illustrative purposes.

The apparatus or system embodying the present invention is shown generally in FIG. 1 at 10. Referring thereto, it is seen that a frame 12 having a horizontal base member 14 and a vertical back member 16 secured thereto are provided. Suitable shoulder straps 18 having an adjustable belt 20 passing through their lower loops 22 allows frame 12, with the crawling pest eliminator equipment secured thereto, to be easily mounted on the back of the pesticide control operator. The operator can thus freely and conveniently manuever the equipment to and between the desired locations in the structure and operate the equipment while still on his back, as will later be described in detail. Also, frame 12 by disconnecting belt 20 can be removed from the operator's back and rested on horizontal base member 14 after the process has been completed.

Figure 2:
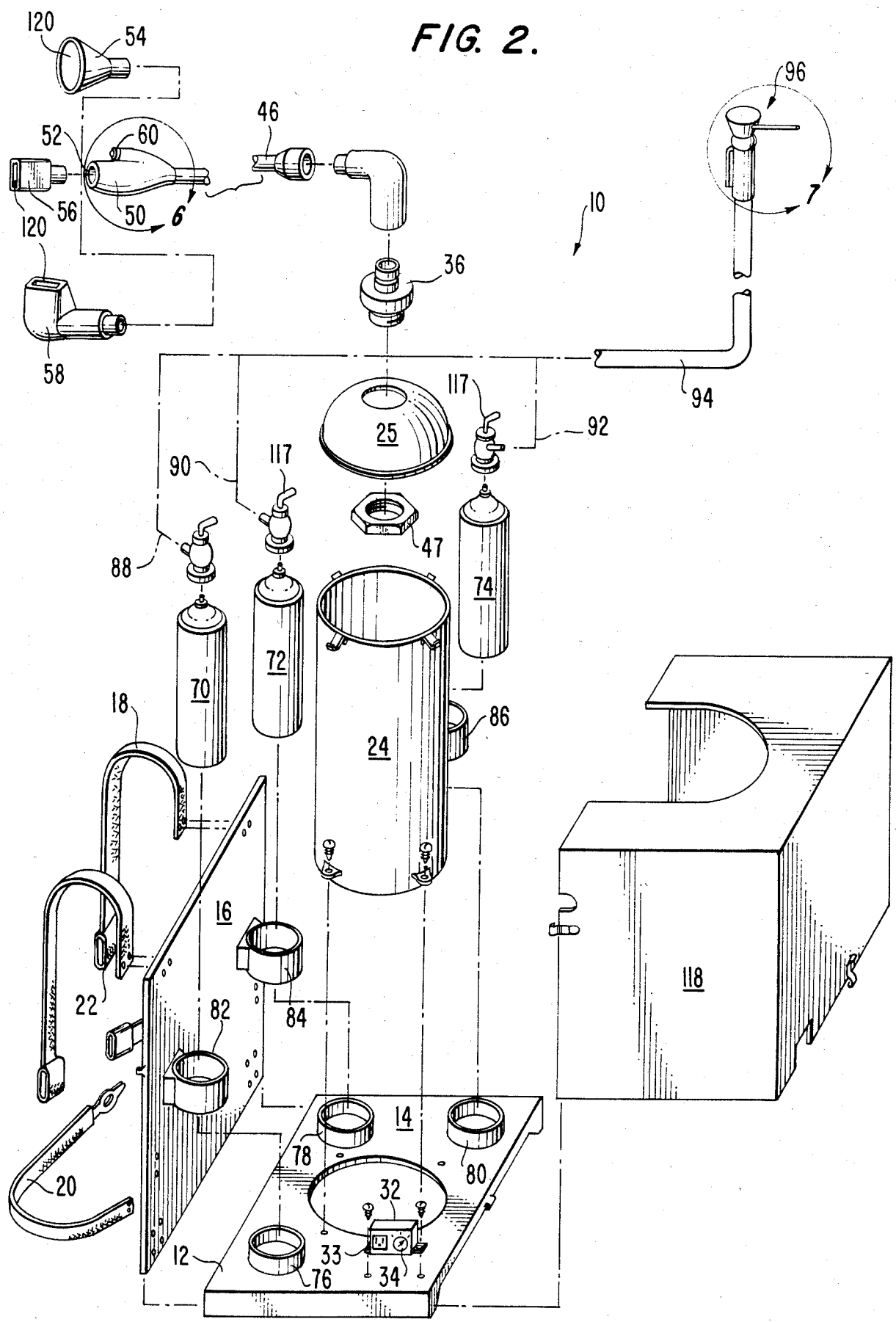
FIG. 2 is an exploded view of the apparatus of FIG. 1.
Figure 3:
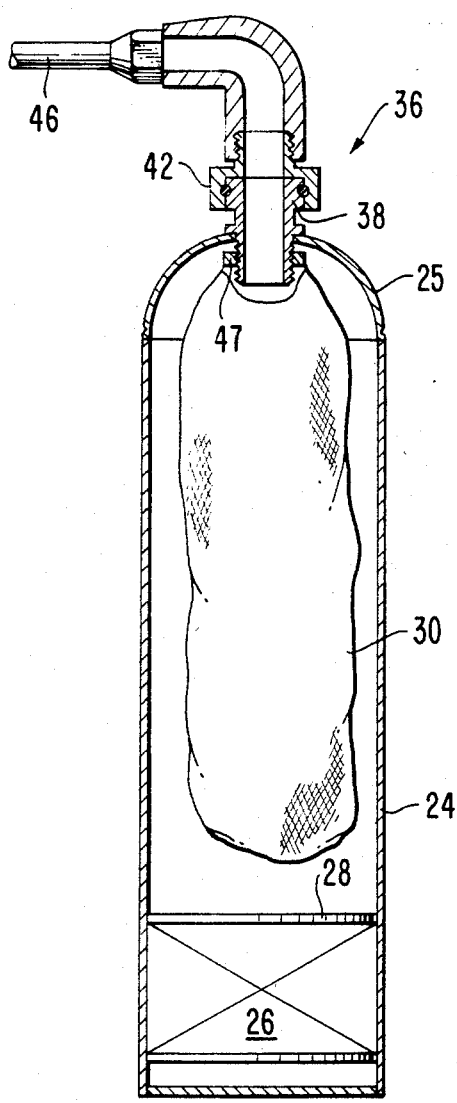
FIG. 3 is a side cross-sectional view of the vacuum of the apparatus of FIG. 1 illustrated in isolation.

A vacuum system recovery tank 24 is secured to base member 14 in a central location. As better shown in FIGS. 2 and 3, recovery tank 24 with removable tank top 25 houses the vacuum motor 26 at its base portion. A filter 28, as illustrated in FIG. 3, is positioned between the recovery bag 30 and motor 26. Motor 26 is a one and a half to two horsepower two-stage motor about four inches deep. Motor 26 is positioned beneath bag 30 so that its heat is dissipated away from the apparatus and operator, and so that vacuum suction and equilibrium are increased. The actual motor internal construction, however, does not form a part of the subject invention and would be apparent to one skilled in the art from the subject disclosure. The electrical connection box 32 for motor 26 is also mounted to base member 14 and it includes a suitable outlet 33 into which an electrical cord can be plugged. An on-off switch 34 having positions for, alternatively, the first and second stages of motor 26 is also positioned on connection box 32.

Figure 4:
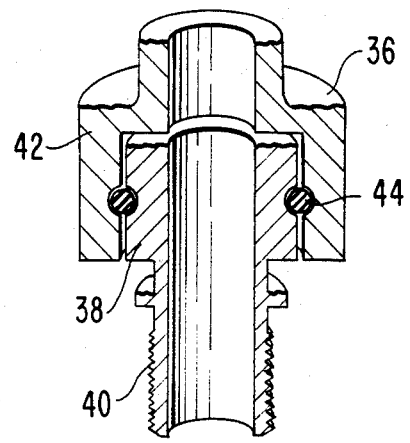
FIG. 4 is an enlarged sectional view taken on line 4—4 in FIG. 3.
Figure 5:
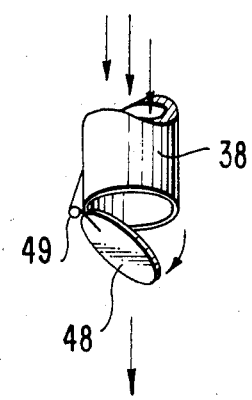
FIG. 5 is an enlarged perspective view of the lower end of the revolving valve of FIG. 4 illustrating the operation of its trap door.

A revolving valve 36 is mounted at the top of recovery tank 24, as best shown in FIGS. 3 and 4. Valve 36 has a lower portion 38 with threads 40 which are screwed into recovery tank 24 and secured thereto. Revolving valve 36 also has an upper outer portion 42 which revolves freely about the bearings 44. This bearing arrangement allows the vacuum hose 46 to rotate relative to tank 24 and to be operated by either hand of the operator or from either side of frame 12. At the lower end of lower portion 38 which extends into the tank, a hex nut 47 can be threaded on threads 40 to secure recovery bag 30 within tank 24. Referring to FIG. 5 a trap door 48 can be provided at the lower end of lower portion 38 and biased shut so that the pests do not escape from bag 30 but opened when motor 26 is operating by the air being sucked through it.

Bag 30 is constructed of any suitable material, such as cotton or synthetic fabric that has breathing holes adapted so that air can freely pass through them and the pests cannot escape out through them. However, it is expected that it will be a sixty four ounce cloth material of rather tough tear-resistant construction. It is further within the scope of the present invention to have the bag formed from a transparent material so that the interior contents can be easily viewed and its fullness readily noted. After bag 30 has filled it is removed from the tank and destroyed in a blending or crushing device (not shown) to ensure that not only the pests but also their eggs are completely disintegrated. A six inch piece of soft wire (not shown) is twisted about the top of bag 30 just below hex nut 48 prior to removing it to ensure that the pests do not escape from the bag.

Hose 46 is connected to revolving valve 36 and extends angularly to its remote end. Hose 46 is about two to three feet long and one inch in diameter. An extension hose can also be attached thereto and used to reach higher walls and ceilings. An adapter 50 is secured at the remote end of the hose. Adapter 50, as best shown in FIG. 2, has an outer female opening 52 into which any of a variety of nozzles 54, 56, 58 can be inserted. Three nozzles are shown in FIG. 2 and each is designed for its specific use. Nozzle 54 which is cone shaped is designed to be used in open areas, both vertical and horizontal. It is used to extract multiple numbers of pests, such as cockroaches or large numbers of visible ants and spiders, which have been flushed out of their hiding places. Nozzle 56 is used to extract cockroaches and other pests from cracks and crevices, such as closets, kitchen cabinets and dressers and other places where the pest may be visible, resting in cracks and crevices. Nozzle 58 is used under similar circumstances as nozzle 56 but is also provided with a ninety-degree angle to access hard-to-reach cracks and crevices.

Figure 6:
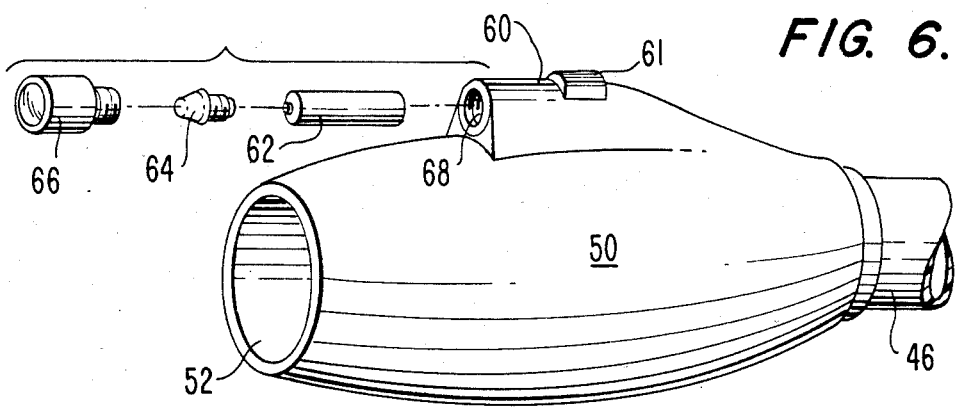
FIG. 6 is an enlarged view taken on line 6—6 in FIG. 2 with the parts thereof illustrated in exploded relation.

Adapter 50 according to the present invention has a flashlight integrally built therein as best illustrated in FIG. 6 at 60. Flashlight 60 is positioned on the upper portion of adapter 50 where its push button switch 62 can be easily manipulated by the operator's hand when he is grasping adapter 50. Flashlight 60 itself is of conventional operation having a pen light battery 62 with a bulb 64 in electrical contact therewith and positioned in a lens 66 which can be screwed into the opening 68 provided for the flashlight in adapter 50.

Three aerosol canisters 70, 72, 74 are held in circular base sleeves 76, 78, 80, respectively, secured on base member 14. Canisters 70, 72 are positioned adjacent vertical member 16 and are further held in upper sleeves 82, 84 extending out from vertical member 16. The third canister 74 is similarly positionable in upper sleeve 86 secured to the outside of recovery tank 24. Each of the aerosol canisters has a line 88, 90, 92 passing through a common carrier hose 94 and to a spray gun shown generally at 96.

Figure 7:
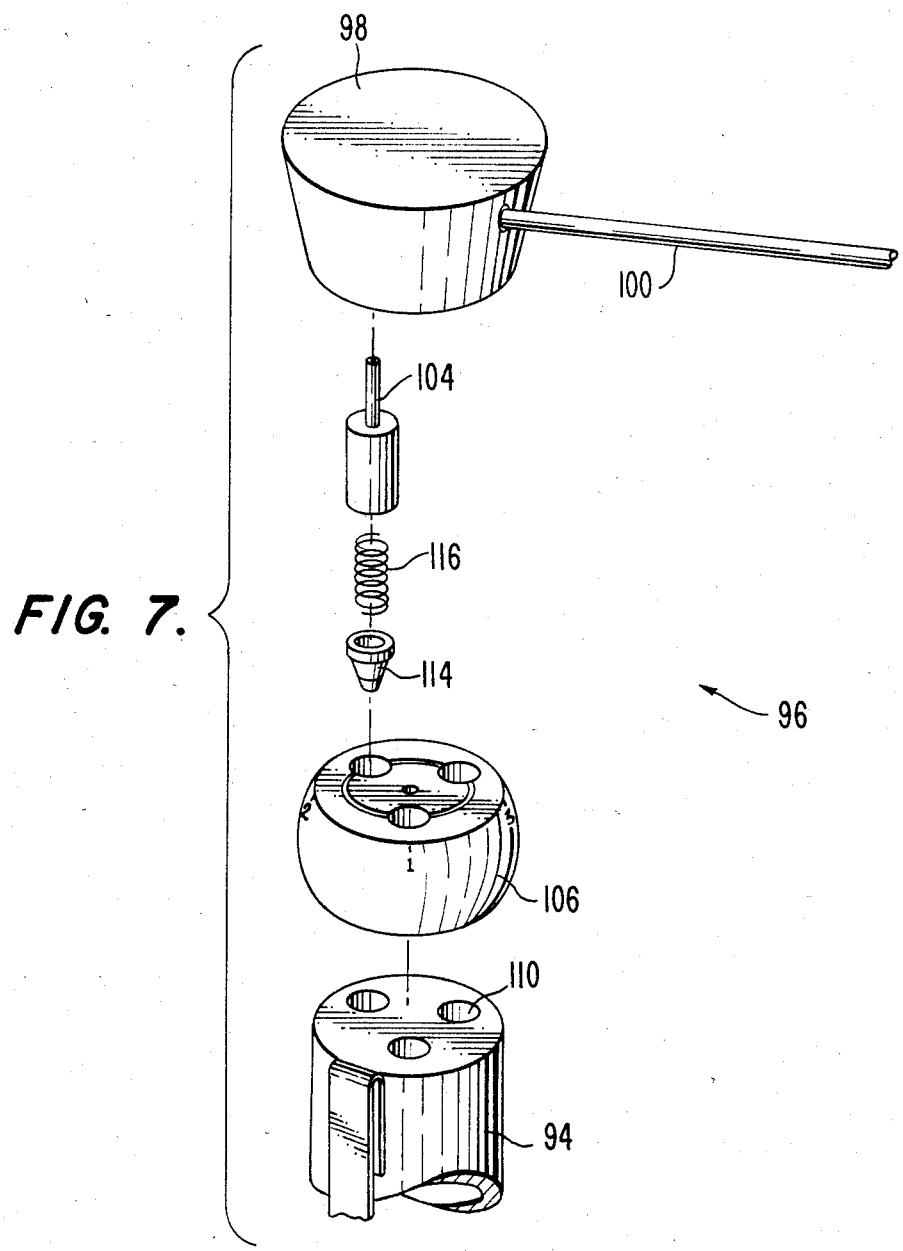
FIG. 7 is an enlarged view taken on line 7—7 in FIG. 2 with the parts thereof illustrated in exploded relation.

Spray gun 96 is best illustrated in FIG. 7, and is shown to comprise a trigger nozzle 98 having a thin elongated nozzle 100 extending out from it. A tubing 104 communicates with nozzle 100 and is positioned in trigger nozzle 98. A ball 106 having three spaced openings 108 passing through it communicates with the three openings 110 of the hose end 112. Nozzle 100 can be caused to communicate with the desired canister by rotating or twisting ball 106 to one of the three positions marked on the ball. The cone-shaped pin 114 retained in tubing 104 remains stationary and when the ball is turned to opening 110, spring 116 forces the pin into that position. The pin locks it in that hole until ball 106 is rotated to another setting. Once locked into that position, the chemical from the communicating canister is dispensed through nozzle 100 by depressing trigger nozzle 98. The trigger nozzle can be conveniently held in one of the operator's hands while the adapter is held in the other. As shown in FIG. 2, a trigger 117 is positioned on the top of each canister which causes it to be closed or opened. In the vertical position, trigger 117 is open and at a 90 degree angle (as shown) it is closed. Even when trigger 117 is open, the pressure in lines 88, 90 or 92 will not permit the chemical to be released out nozzle 100, until trigger nozzle 98 is depressed.

Aerosol canister 70 is filled with a flushing agent. The flushing agent preferably is non-toxic since it is not meant to kill the crawling pests but merely to flush them out of their hiding places. Commercially available low toxic agents which can be used include Pyrethrum 0.5% and Resmethrin 1%. The second canister 72 is filled with a residual such as Durban 0.5%, Diazinen 1%, Bagon 1% or DDVP 0.5%. The third canister 74 is a reserve canister which can be filled with either the flushing agent or the residual. By twisting ball 106 of spray gun 96, as previously decribed, it is possible to communicate nozzle 100 selectively with the desired canister. A removable protective cover 118 attachable to frame 12 covers the frame components including the canisters and the vacuum motor.

Thus, the system functions very conveniently with apparatus 10 mounted to the operator's back by securing shoulder straps 18 over his shoulders and belt 20 through loops 22 of the straps. The operator is thereby free to move about the structure. Although it is within the scope of the present invention to mount a battery pack (not shown) on frame 12 to power the apparatus, it is anticipated that this would be too heavy for most uses. Thus, an electrical cord is first plugged into a suitable electric outlet and into the outlet box 32 on frame 12. The wall and floor surfaces of the structure can be investigated to determine the location of the crawling pests and their eggs visually by pressing button 62 on flashlight 60 and illuminating the darkened crevices and cracks therein. Spray gun 96 is then manipulated until nozzle 100 is in communication with flushing agent aerosol container 70. Spray gun 96 is then pointed in the desired direction in the cracks and crevices and trigger nozzle 98 depressed and the flushing agent sprayed therein. The crawling pests, such as cockroaches, ants or spiders, are thereby flushed out of the cracks. Then vacuum motor 26 can be turned to its first stage position by adjusting switch 34. With the desired nozzle 54, 56 or 58 secured in adapter 50, the adapter is grasped and the nozzle slid along the surface. It is noted that the opening of each nozzle has a rubbery, flexible perimeter 120 thereby facilitating a close sliding action of the nozzle along the surfaces. The crawling pests are thereby suctioned up through vacuum hose 46 into the recovery bag 30 by the suction created by vacuum motor 26. To pull the eggs and the pests hiding deeper in the crevices, the vacuum motor can be turned or switched to its second stage by adjusting switch 34 which provides additional suction power. It is recomended though, to extend the operational life of vacuum motor 26, that the second stage only be used when necessary. Then after generally all of the crawling pests and their eggs have been vacuumed up from the surfaces, vacuum motor 26 is turned off and spray gun 96 is turned to its position wherein it communicates with residual aerosol canister 72 and the residual is then sprayed from canister 72 on the surfaces by depressing trigger nozzle 98.

Figure 8:
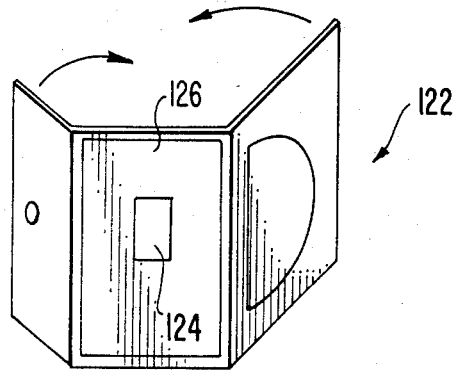
FIG. 8 is a perspective view of a glue trap of the present invention with the direction of assembly of the trap illustrated.
Figure 9:
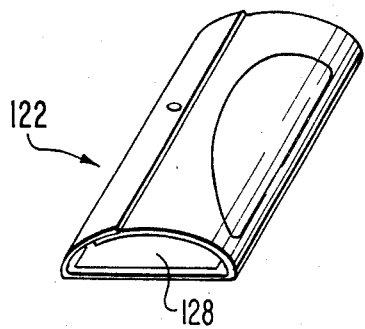
FIG. 9 is a perspective view of the glue trap of FIG. 8 illustrated in its assembled ready-to-use condition.

After the residuals have been sprayed, the baited sticky traps as best shown in FIGS. 8 and 9 at 122 are positioned on the various surfaces. As shown, the traps have an adhesive coating 124 on their bottom surface 126 so that they can be adhered to vertical surfaces as well as downwardly depending horizontal surfaces, such as inside cabinets, behind bookcases and in bathrooms and closets. They can thus be placed out of sight and positioned so as to attract to their non-toxic baited sticky interior floor 128 and trap any remaining pests that might later crawl out of their hiding places in search of food or water. The traps will last for about two months. The present design of the traps also better disguises the baited sticky trap floor 128 from the view from the exterior. This is for aesthetic reasons so that the unattractive mess of pests when stuck to floor 128 are not readily visible from the outside. Trap 122 is also smaller (three inches long and one and one half to three and one half inches wide) than existing so-called "Mr. Sticky" traps to better fit in small out-of-the-way places. Trap 122 is supplied in a flat configuration for easy transporting and then at the job site can be folded as shown in FIG. 8 and secured together to form its completed design as shown in FIG. 9.

Trap 124 does not use any toxic eliminator pesticides so the entire system of the present invention provides a safer means than previously possible for ridding structures of crawling pests, such as cockroaches, even those varieties which have become resistant to current pesticides. Since little or no pesticides are used, the development of insecticide resistance also is not promoted. In addition to removing the pests, their eggs are also removed subsequently and destroyed thus stopping the roach propagation cycle and thereby providing a more efficient and safer pest eliminator means.

From the foregoing detailed description, it will be evident that there are a number of changes, adaptations, and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:
1. A crawling pest eliminator system comprising:
a frame,
a crawling pest flushing means supported on said frame for spraying a flushing agent and thereby flushing crawling pests out of their hiding places,
a vacuuming system supported on said frame,
said vacuuming system including a removable recovery container, a nozzle adapted to ride on surfaces for vacuuming into said recovery container the eggs of the crawling pests and the crawling pests themselves including those flushed out by said crawling pest flushing means, and an elongated vacuum hose operatively connected to said recovery container and said nozzle, and
a residual depositing means supported by said frame for depositing a pesticide residual on the surfaces which have been vacuumed of crawling pests and their eggs by said vacuuming system.

2. The system of claim 1 including,
a back attaching means for attaching said frame to the back of the operator.

3. The system of claim 2 including,
said back attaching means including a pair of operator shoulder belts having loops at their outer ends, and a waist belt passing through said loops and thereby securing said shoulder belts to the shoulders of the operator.

4. The system of claim 1 including,
said frame including a base on which said vacuuming system is supported, and an upright member secured to said base and to which at least one said crawling pest flushing means or said residual depositing means is attached.

5. The system of claim 1 including,
said crawling pest flushing means including a flushing aerosol canister containing the flushing solution and supported by said frame, and
said residual depositing means including a residual aerosol canister containing the pesticide residual and supported by said frame.

6. The system of claim 5 including,
a spray gun communicable with said flushing aerosol canister and with said residual aerosol canister, and
said spray gun including a spray nozzle and a communicating means for selectively communicating one said flushing aerosol canister or said residual aerosol canister with said spray nozzle.

7. The system of claim 1 including,
said vacuuming system including an upright support attached to said frame, and
said upright support housing said recovery container, a vacuum motor positioned below said recovery container, and a filter positioned between said vacuum motor and said recovery container.

8. The system of claim 7 including,
said vacuuming system further including said elongated vacuum hose communicating with said recovery container and a revolving valve means associated with said upright support and with said vacuum hose for permitting said vacuum hose to be rotated relative to said upright support.

9. The system of claim 8 including,
said nozzle being attached to the end of said vacuum hose.

10. The system of claim 1 including,
said recovery container comprising a removable recovery bag, and
said vacuuming system including an upright support housing said recovery bag, a revolving valve having a first portion fixed relative to said upright support and a second portion fixed relative to said vacuum hose and rotatable relative to said first portion, and an attaching means for removably attaching said recovery bag to said first portion.

11. The system of claim 10 including,
said attaching means including a hex nut.

12. The system of claim 10 including,
said recovery bag comprising a transparent cloth bag.
13. The system of claim 1 including,
said vacuuming system including said elongated vacuum hose communicating with said recovery tank and a spring biased trap door associated with said vacuum hose and biased shut when said vacuuming system is not creating suction to prevent the escape of crawling pests from said recovery container out through said vacuum hose.
14. The system of claim 1 including,
said vacuuming system including a two stage 1.5 to 2.0 horsepower vacuum motor.
15. The system of claim 1 including,
said vacuuming system including an electrical inlet box secured to said frame.
16. The system of claim 1 including,
said nozzle having an outer perimeter defining a suction opening, and
said perimeter being formed of a flexible material adapted to hug and ride along the surfaces to be vacuumed.
17. The system of claim 1 including,
said vacuuming system including said vacuum hose communicating with said recovery container,
said vacuum hose including an end remote from said recovery container and an adapter member secured to said remote end,
said adapter member including a flashlight assembly integrally mounted thereon, and
said flashlight assembly including an on-off switch operably accessible to the hand of an operator who is grasping said adapter member, a coupling member to which said nozzle couples, and a bulb positioned, when turned to its "on" position by said on-off switch, to illuminate the hiding places of the crawling pests.
18. The system of claim 1 including,
said crawling pests including cockroaches.
19. The system of claim 1 including,
said flushing agent being selected from but not limited to the group of Pyrethrum 0.5% and Resmethrin 1%.
20. The system of claim 1 including,
said pesticide residual being selected from the group of Durban 0.5%, Diazinen 1%, Bagon 1% and DDVP 0.5%.
21. A method of eliminating crawling pests from surfaces comprising:
spraying on the surfaces a flushing agent from a flushing agent container mounted on a frame,
thereafter, vacuuming from the surfaces the crawling pests flushed out by said flushing agent and also the eggs of the crawling pests into a recovery container supported on said frame, and
thereafter, applying to the surfaces a residual from a pesticide residual container mounted on said frame.
22. The method of claim 21 including,
before said spraying, attaching said frame to the back of the operator, and
after said applying, removing said frame from the back of said operator.
23. The method of claim 21 including,
after said spraying, attaching baited glue traps to the surfaces to attract and capture crawling pests not vacuumed into said recovery container or killed by said residual.
24. The method of claim 23 including,
said attaching including attaching baited glue traps to vertical surfaces.
25. The method of claim 23 including,
said attaching including attaching baited glue traps to downwardly disposed horizontal surfaces.
26. The method of claim 21 including,
said vacuuming including sliding on the surfaces the resilient material perimeter surface of a vacuum nozzle opening which communicates with said recovery container.
27. The method of claim 21 including,
after said vacuuming, removing said recovery container with the vacuumed crawling pests and eggs therein from said frame and destroying said removed recovery container.
28. The method of claim 27 including,
said destroying including blending said recovery container.
29. The method of claim 27 including,
said destroying including crushing said recovery container.
30. The method of claim 21 including,
said vacuuming including sucking the crawling pests and eggs through a nozzle assembly, and
before said applying, shining a flashlight integrally mounted on said nozzle assembly on the surfaces to better illuminate said surfaces.
31. The method of claim 21 including,
said crawling pests including cockroaches.
32. The method of claim 21 including,
said flushing agent being selected from but not limited to the group of Pyrethrum 0.5% and Resmethrin 1%.
33. The method of claim 21 including,
said residual being selected from the group of Durban 0.5%, Diazinen 1%, Bagon 1% and DDVP 0.5%.

* * * * *